(12) United States Patent
Teraura et al.

(10) Patent No.: US 8,780,588 B2
(45) Date of Patent: Jul. 15, 2014

(54) BIDIRECTIONAL DC/DC CONVERTER WITH SIMPLE CONTROL OPERATION

(75) Inventors: Kouichi Teraura, Hyogo (JP); Hiroyuki Nishino, Osaka (JP); Hiroaki Koshin, Osaka (JP); Yukihiro Murata, Osaka (JP); Yasuhisa Ihira, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/643,582

(22) PCT Filed: Apr. 7, 2011

(86) PCT No.: PCT/IB2011/000750
§ 371 (c)(1),
(2), (4) Date: Oct. 26, 2012

(87) PCT Pub. No.: WO2011/135415
PCT Pub. Date: Nov. 3, 2011

(65) Prior Publication Data
US 2013/0044519 A1 Feb. 21, 2013

(30) Foreign Application Priority Data

Apr. 28, 2010 (JP) .................................. 2010-103557

(51) Int. Cl.
H02M 3/335 (2006.01)
(52) U.S. Cl.
USPC .......................... 363/21.02; 363/127; 363/132
(58) Field of Classification Search
USPC .......................... 363/17, 21.02, 21.1, 127, 132
See application file for complete search history.

(56) References Cited

U.S. PATENT DOCUMENTS

| 4,953,068 | A | * | 8/1990 | Henze ............................. 363/17 |
| 6,574,125 | B2 | | 6/2003 | Matsukawa et al. |
| 7,102,901 | B2 | * | 9/2006 | Falk et al. ....................... 363/65 |
| 7,796,406 | B2 | * | 9/2010 | Lev ............................. 363/21.02 |
| 8,363,427 | B2 | * | 1/2013 | Anguelov et al. ........... 363/21.02 |
| 2007/0070655 | A1 | * | 3/2007 | Eguchi et al. .................... 363/17 |

(Continued)

FOREIGN PATENT DOCUMENTS

| JP | 2000-358359 | 12/2000 |
| JP | 2004-357346 | 12/2004 |

(Continued)

OTHER PUBLICATIONS

International Search Report for corresponding International Application No. PCT/IB2011/000750 mailed Aug. 16, 2011.

(Continued)

Primary Examiner — Jue Zhang
Assistant Examiner — Lakaisha Jackson
(74) Attorney, Agent, or Firm — Renner, Otto, Boisselle & Sklar, LLP

(57) ABSTRACT

Disclosed is a bidirectional DC/DC converter including: a primary side circuit that includes a first DC power source or a first load; a secondary side circuit that includes a second load or a second DC power source; and a power transfer unit that is capable of transferring power bi-directionally between the primary side circuit and the secondary side circuit. Further, the bidirectional DC/DC converter includes a control circuit that controls the primary side circuit and secondary side circuit in such a way that current flows through the power transfer unit from the first DC power source to the second load or from the second DC power source to the first load.

8 Claims, 10 Drawing Sheets

(56) References Cited

U.S. PATENT DOCUMENTS

| | | | |
|---|---|---|---|
| 2008/0198632 A1* | 8/2008 | Takayanagi | 363/17 |
| 2010/0090533 A1 | 4/2010 | Shimada et al. | |
| 2010/0214808 A1* | 8/2010 | Rodriguez | 363/37 |
| 2010/0259955 A1 | 10/2010 | Shimada | |
| 2012/0134180 A1* | 5/2012 | Watanabe et al. | 363/17 |
| 2012/0170341 A1* | 7/2012 | Fornage et al. | 363/132 |

FOREIGN PATENT DOCUMENTS

| | | |
|---|---|---|
| JP | 2008-193817 | 8/2008 |
| JP | 2010-081736 | 4/2010 |
| WO | 2009/075366 | 6/2009 |

OTHER PUBLICATIONS

Form PCT/ISA/237 for corresponding International Application No. PCT/IB2011/000750 dated Aug. 16, 2011.

Korean Office Action dated Jan. 29, 2014 (with English summary thereof) for corresponding Korean Application No. 10-2012-7027007.

Taewoong Kim et al., Power Electronic Circuit, Jan. 21, 2005, pp. 280-289 (with English translation thereof).

* cited by examiner

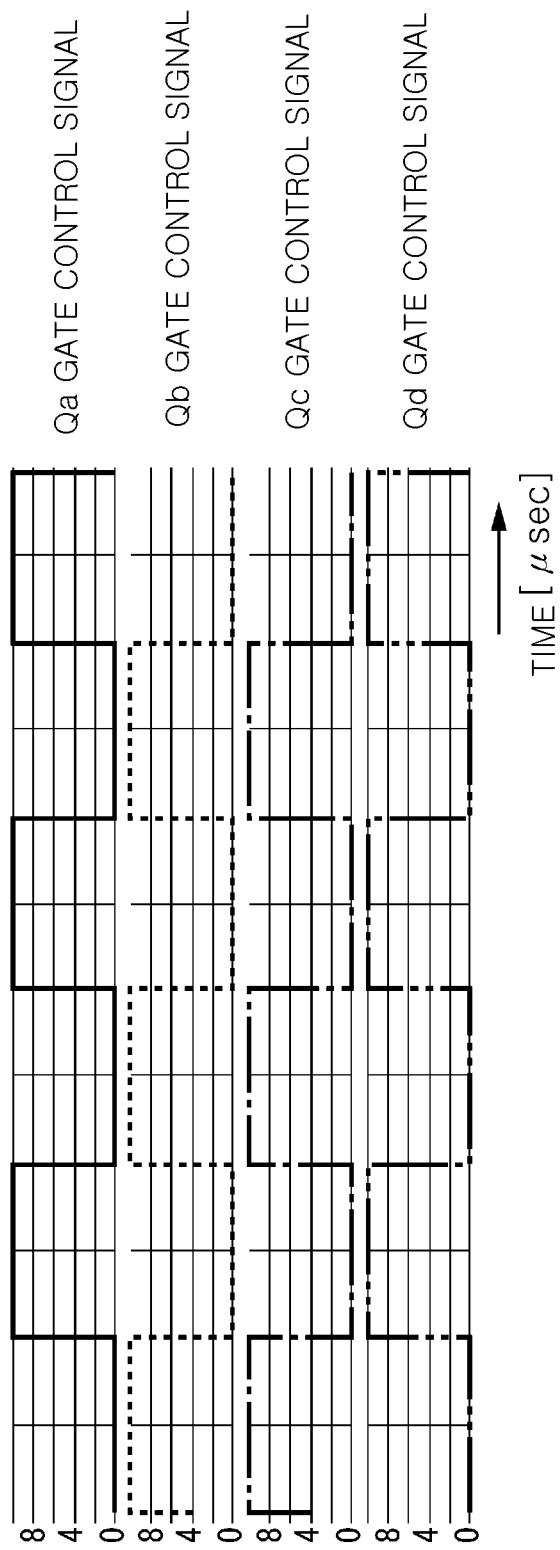

BIDIRECTIONAL DC/DC CONVERTER WITH SIMPLE CONTROL OPERATION

FIELD OF THE INVENTION

The present invention relates to a bidirectional DC/DC converter configured such that when a DC power source and a load are connected to two terminals, respectively, a desired DC power can be supplied to one terminal to which the load is connected from the other terminal to which the DC power source is connected.

BACKGROUND OF THE INVENTION

Recently, with the remarkable progress in power electronics technology, a power conversion technology in which a DC power or AC power supplied from a DC power source or AC power source is converted into a desired power without substantial power loss using a semiconductor switch or the like has been attracting attention. In particular, in recent years requiring environmental considerations in using the power, it becomes important to efficiently use electrical energy of a storage battery such as a fuel cell, a solar cell, and a secondary cell (hereinafter, referred to as "storage battery or the like") in addition to electrical energy available from an existing commercial power source.

For this reason, power conversion technology in power electronics field has become indispensable now. A semiconductor switch used in the power conversion apparatus as such converts freely and broadly the power, and performs on-off switching at a high frequency. Thus, in the power conversion, it is required to suppress the switching loss or noise caused by switching of the semiconductor switch.

As a switch for suppressing the switching loss or noise in the power conversion, for example, there is one disclosed in Patent Document 1. Patent Document 1 discloses a bidirectional current switch regenerating snubber energy. In the disclosed switch, four semiconductor switch elements without reverse blocking capability, each having a reverse conducting diode and P-MOSFET connected in parallel, are connected in a full bridge, and a capacitor for absorbing the snubber energy is connected between the upper and lower sides of electric potential. The operation of the bidirectional current switch as such will be described with reference to FIG. 8. FIG. 8 is an explanatory diagram showing a circuit configuration of a conventional bidirectional current switch.

Referring to FIG. 8, a full-bridge circuit is connected between a current terminal 7 and a current terminal 8. The full-bridge circuit is configured by parallel connection of a first series circuit including a semiconductor switch 1A and a semiconductor switch 1B which do not have a reverse blocking capability and are connected in the reverse direction, and a second series circuit including a semiconductor switch 1C and a semiconductor switch 1D which do not have a reverse blocking capability and are connected in the reverse direction.

Further, each of the semiconductor switches 1A to 1D may be constituted by, e.g., a p-channel metal-oxide-semiconductor field-effect transistor (P-MOSFET) and a parasitic diode connected in parallel thereto. Furthermore, a snubber capacitor 4 is provided between midpoints of the first series circuit and second series circuit so as to connect the midpoints thereof. In the first series circuit, a drain electrode Da of the semiconductor switch 1A is connected to a drain electrode Db of the semiconductor switch 1B. In the second series circuit, a source electrode Sc of the semiconductor switch 1C is connected to a source electrode Sd of the semiconductor switch 1D.

Further, a source electrode Sa of the semiconductor switch 1A and a drain electrode Dc of the semiconductor switch 1C are connected to the current terminal 7. In addition, a source electrode Sb of the semiconductor switch 1B and a drain electrode Dd of the semiconductor switch 1D are connected to the current terminal 8. In this bidirectional current switch, gate control signals are respectively applied to gate electrodes Ga to GD of the semiconductor switches 1A to 1D from a control circuit (not shown, hereinafter the same), so that the semiconductor switches 1A to 1D perform an on-off operation in response to the gate control signals applied to the gate electrodes Ga to GD.

First, in the case where the current flows in the forward direction to the current terminal 8 from the current terminal 7, the control circuit sends the gate control signals to the gate electrode Gb of the semiconductor switch 1B and the gate electrode Gc of the semiconductor switch 1C to turn on the semiconductor switch 1B and the semiconductor switch 1C at the same time. At this time, the control circuit does not send the gate control signals to the gate electrode Ga of the semiconductor switch 1A and the gate electrode Gd of the semiconductor switch 1D. However, since the current flows in the forward direction of each parasitic diode by the parasitic diode of each of the semiconductor switch 1A and the semiconductor switch 1D, the current flows through the semiconductor switch 1A and the semiconductor switch 1D. Accordingly, the current flows in the direction from the current terminal 7 to the current terminal 8.

On the other hand, in the case where the current flows in the backward direction to the current terminal 7 from the current terminal 8, the control circuit sends the gate control signals to the gate electrode Ga of the semiconductor switch 1A and the gate electrode Gd of the semiconductor switch 1D to turn on the semiconductor switch 1A and the semiconductor switch 1D at the same time. At this time, the control circuit does not send the gate control signals to the gate electrode Gb of the semiconductor switch 1B and the gate electrode Gc of the semiconductor switch 1C. However, since the current flows in the forward direction of each parasitic diode by the parasitic diode of each of the semiconductor switch 1B and the semiconductor switch 1C, the current flows through the semiconductor switch 1B and the semiconductor switch 1C. Accordingly, the current flows in the direction from the current terminal 8 to the current terminal 7.

Thus, according to the bidirectional current switch, by alternately driving a pair of the semiconductor switches 1A and 1D located on a diagonal line and a pair of the semiconductor switches 1B and 1C located on a diagonal line, the current may flow in both forward and backward directions between the current terminal 7 and the current terminal 8.

Further, when blocking the current between the current terminal 7 and the current terminal 8 in the bidirectional current switch, the control circuit turns off the driven semiconductor switches by stopping the application of the gate control signal to each of the gate electrodes of the semiconductor switches to which the gate control signals have been applied among the semiconductor switches 1A to 1D. Thus, the current that had been flowing during the ON time is diverted to the snubber capacitor 4 and the snubber capacitor 4 is charged until the current becomes zero.

A voltage across the snubber capacitor 4 increases until the current flowing through the snubber capacitor 4 becomes zero, and the current of the bidirectional current switch is blocked automatically by the parasitic diode of the semiconductor switch such that no current flows. Next, when the current is allowed to flow through the bidirectional current switch, for example, when the gate control signals are respectively applied to the gate electrode Ga of the semiconductor switch 1A and the gate electrode Gd of the semiconductor switch 1D by the control circuit, charges that have been charged in the snubber capacitor 4 are discharged through the semiconductor switch 1A and the semiconductor switch 1D, and the energy that has been charged in the snubber capacitor 4 is supplied to the load side.

As an example of the power conversion apparatus using the bidirectional current switch disclosed in Patent Document 1, there is an AC/DC power conversion apparatus disclosed in Patent Document 2. In the AC/DC power conversion apparatus, a capacitor is connected between the DC terminals of four reverse conduction type semiconductor switches (bidirectional current switches) having a single phase full-bridge configuration, and a secondary battery is connected between the DC terminals with a DC inductor therebetween. Further, an AC power source is coupled between AC terminals with an AC inductor therebetween.

Accordingly, a pair of semiconductor switches located on a diagonal line are turned on or turned off synchronously with the phase of a power voltage, so that an AC power source with a frequency lower than the resonance frequency determined by the AC inductor and the capacitor is connected to it. According to the AC/DC power conversion apparatus of Patent Document 2, a large AC inductor is necessary compared to a conventional pulse width modulation (PWM) converter, but the on-off of the reverse conduction type semiconductor switches is performed one time during one cycle of the AC power source in principle, thereby lessening harmonics in the current waveform, and significantly reducing switching loss by reducing the number of on-off operations of the reverse conduction type semiconductor switches.

[Patent Document 1] Japanese Patent Laid-open Publication No. 2000-358359

[Patent Document 2] Japanese Patent Laid-open Publication No. 2008-193817

However, in the AC/DC power conversion device such as disclosed in Patent Document 2, the control circuit turns on and off a pair of reverse conduction type semiconductor switches located on a diagonal line among the reverse conduction type semiconductor switches in synchronization with the voltage phase of the AC power source. In this case, the control circuit sends gate control signals to prevent two pairs located on diagonal lines from being turned on at the same time, and switches the conversion from AC power to DC power and the conversion from DC power to AC power in response to the phases of the gate control signals.

To this end, the control circuit needs to monitor the voltage phase of the AC power source, which may lead to a problem that the control operation of the control circuit becomes complicated. Therefore, there is a demand for a power conversion apparatus which can output a desired power through a simpler control operation. As an example of the power conversion apparatus, particularly, there is a bidirectional DC/DC converter which can bidirectionally convert the DC power to be supplied to the secondary side when the DC power source is connected to the primary side and the storage battery or the like is connected to the secondary side, or the DC power to be supplied to the primary side when the storage battery or the like is connected to the primary side and the DC power source is connected to the secondary side, and it is required to bidirectionally output a desired DC power through a simpler control operation in terms of stable power supply.

SUMMARY OF THE INVENTION

In view of the above, the present invention provides a bidirectional DC/DC converter capable of bidirectionally outputting a desired DC power between the primary side and the secondary side when one of a DC power source and a load is connected to the primary side and the other is connected to the secondary side, through a very simple control operation of synchronously adjusting on-duty ratios that are switching frequencies of bidirectional current switches provided on the primary side and on the secondary side, respectively.

In accordance with an aspect of the present invention, there is provided a bidirectional DC/DC converter capable of converting a direct current (DC) between a first DC power source or a first load and a second load or a second DC power source, including: a primary side circuit including a first DC power source or a first load; a secondary side circuit including a second load or a second DC power source; and a transformer unit which can transfer a power outputted from the primary side circuit to the secondary side circuit, wherein the primary side circuit includes: a first bidirectional current switch including a bridge circuit constituted by four semiconductor switches, and a capacitor connected between two terminals of the bridge circuit; a first control circuit which performs on/off control of each of the semiconductor switches by applying a control signal to a gate electrode of each of the semiconductor switches; and a first inductor, one end of which is connected to the first DC power source or first load, and the other end of which is connected to the capacitor of the bridge circuit, and wherein the secondary side circuit includes: a second bidirectional current switch including a bridge circuit constituted by four semiconductor switches, and a capacitor connected between two terminals of the bridge circuit; a second control circuit which performs on/off control of each of the semiconductor switches by assigning a control signal to a gate electrode of each of the semiconductor switches; and a second inductor, one end of which is connected to the second DC power source or second load, and the other end of which is connected to the capacitor of the bridge circuit.

Preferably, each of a resonance frequency determined by an electrostatic capacitance of the capacitor of the primary side circuit and an inductance of the first inductor and a resonance frequency determined by an electrostatic capacitance of the capacitor of the secondary side circuit and an inductance of the second inductor is higher than a switching frequency of the eight semiconductor switches.

Further, among the semiconductor switches provided on each of the primary side circuit and the secondary side circuit, pairs of semiconductor switches located on a diagonal line operate in synchronization with each other in response to the control signals which are respectively outputted from the first and the second control circuit.

Further, it is preferred that power supply from the primary side circuit to the secondary side circuit or vice verse is switched in response to control signals which are respectively outputted by the first control circuit and the second control circuit.

BRIEF DESCRIPTION OF THE DRAWINGS

The objects and features of the present invention will become apparent from the following description of embodiments, given in conjunction with the accompanying drawings, in which:

FIGS. 2A and 2B illustrate explanatory diagrams showing temporal variations of gate control signals applied to gate electrodes of semiconductor switches, wherein FIG. 2A is an explanatory diagram showing temporal variations of gate control signals respectively applied to gate electrodes Ga, Gb, Gc and Gd, and FIG. 2B is an explanatory diagram showing temporal variations of gate control signals respectively applied to gate electrodes Ge, Gf, Gg and Gh;

DETAILED DESCRIPTION OF THE EMBODIMENTS

Hereinafter, embodiments of the present invention will be described in detail with reference to the accompanying drawings which form a part hereof.

(First Embodiment)

Figure 1A:
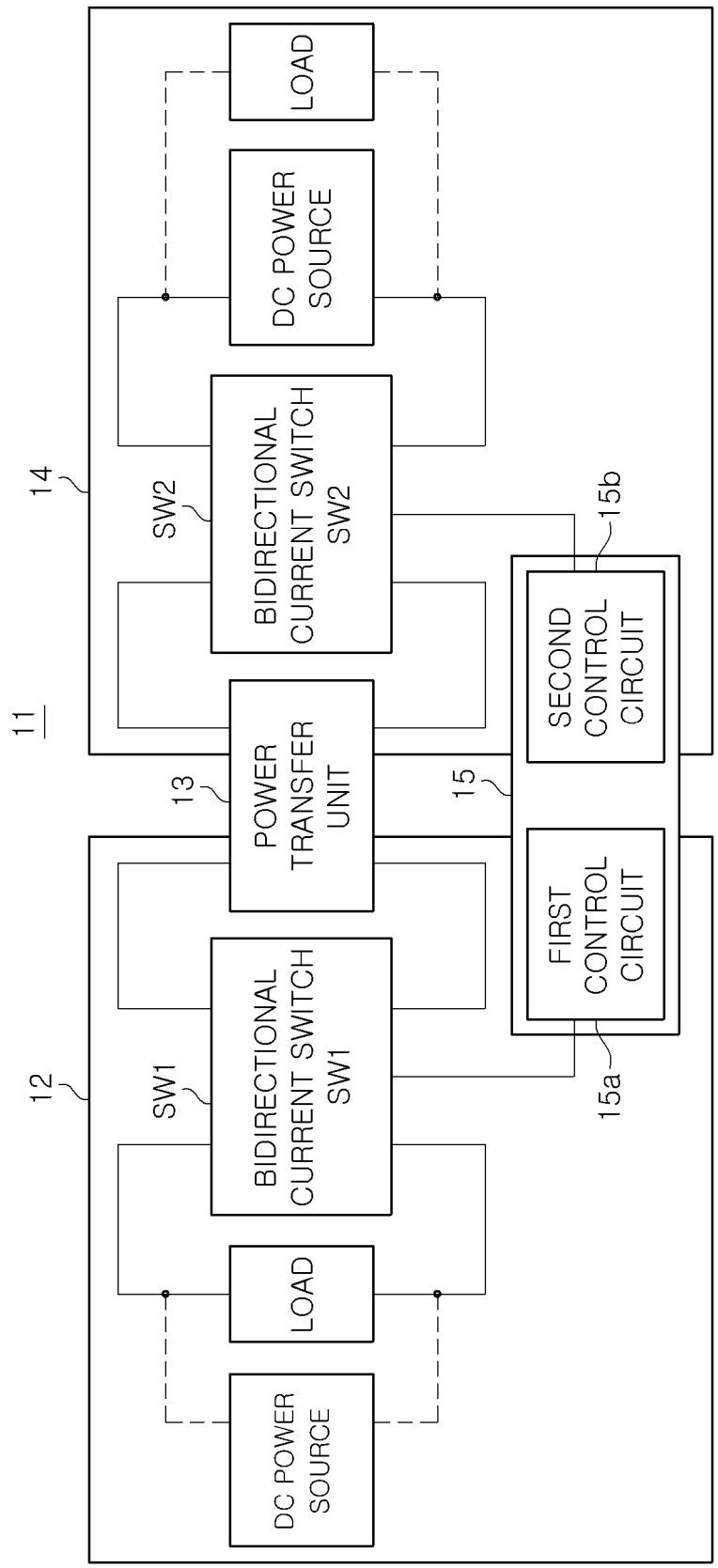
FIG. 1A is a block diagram showing a bidirectional DC/DC converter in accordance with a first embodiment of the present invention.
Figure 1B:
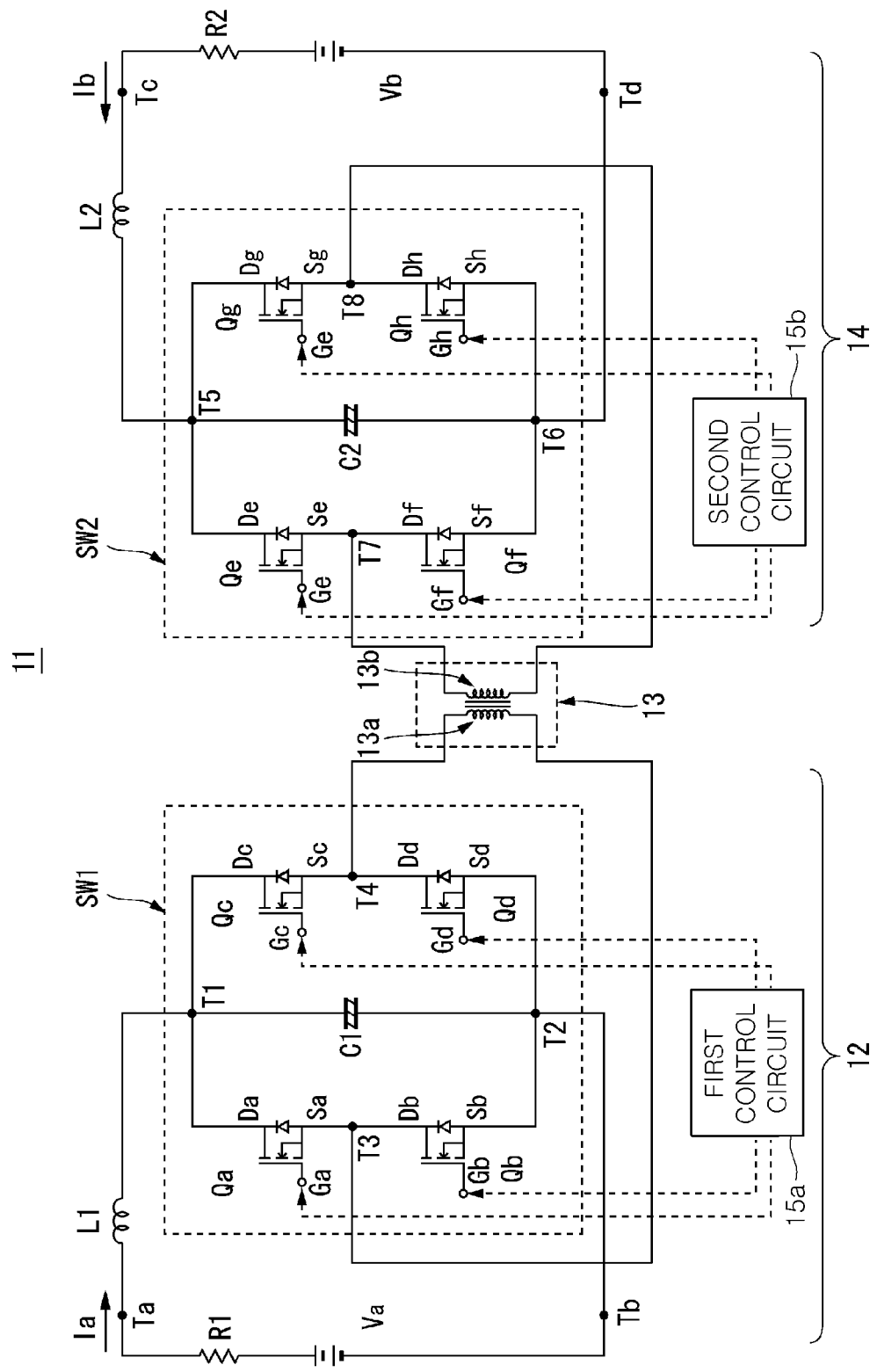
FIG. 1B is a detailed circuit diagram of the bidirectional DC/DC converter in accordance with the first embodiment of the present invention.
Figure 2B:
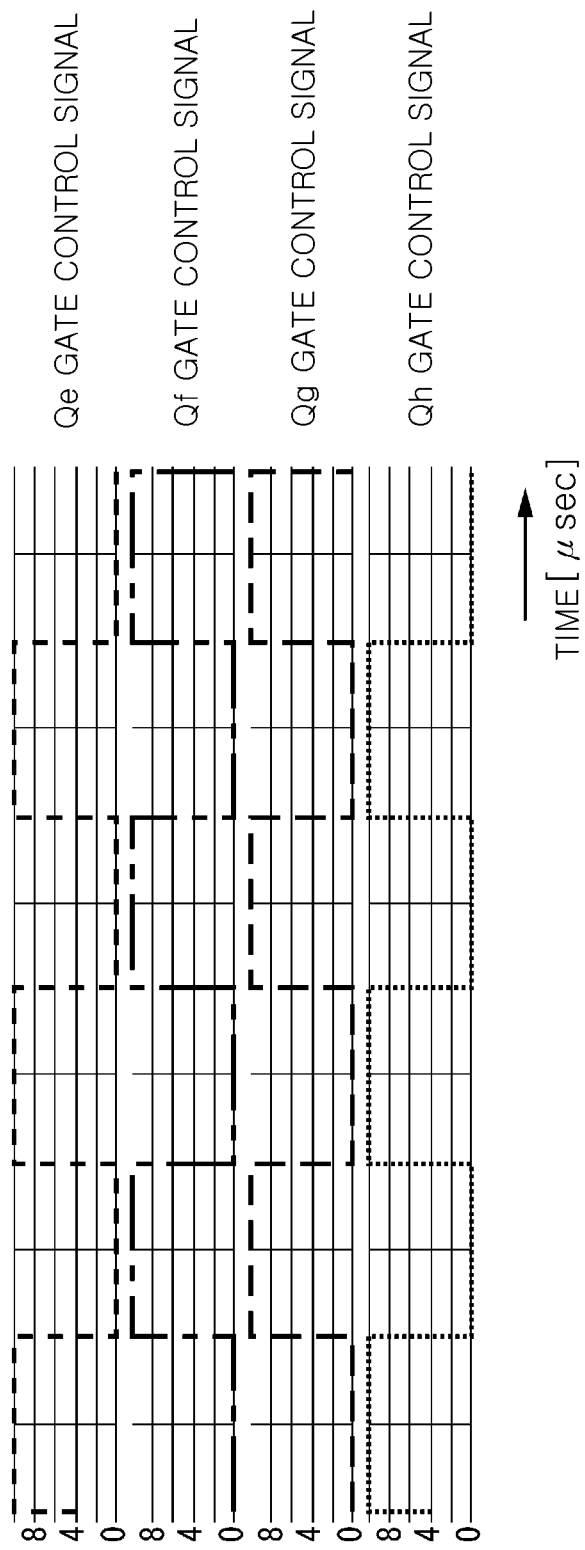

A circuit configuration of a bidirectional DC/DC converter in accordance with a first embodiment of the present invention will be described with reference to FIGS. 1A to 2B. FIG. 1A is a block diagram showing a configuration of a bidirectional DC/DC converter 11 in accordance with the first embodiment of the present invention, and FIG. 1B is a detailed circuit diagram thereof. FIGS. 2A and 2B illustrate explanatory diagrams showing temporal variations of gate control signals applied to gate electrodes Ga to Gh of semiconductor switches Qa to Qh in the bidirectional DC/DC converter 11 of the first embodiment.

FIG. 2A is an explanatory diagram showing temporal variations of gate control signals respectively applied to gate electrodes Ga, Gb, Gc and Gd, and FIG. 2B is an explanatory diagram showing temporal variations of gate control signals respectively applied to gate electrodes Ge, Gf, Gg and Gh. Further, an on-duty ratio of the gate control signals in FIGS. 2A and 2B is assumed to be 49% of one cycle by considering the dead time of each of the semiconductor switches Qa to Qh.

Referring to FIG. 1B, the bidirectional DC/DC converter 11 includes a primary side circuit 12, a transformer 13 (power transfer unit) and a secondary side circuit 14. The units 12 to 14 constituting the bidirectional DC/DC converter 11 will be described below. A load or first DC power source Va is connected between a terminal Ta and a terminal Tb of the primary side circuit 12, and a load or second DC power source Vb is connected between a terminal Tc and a terminal Td of the secondary side circuit 14.

In the bidirectional DC/DC converter according to the present invention, power may be supplied from the primary side to the secondary side by connecting the DC power source to the primary side circuit 12 and the load to the secondary side circuit 14, and power may be supplied from the secondary side to the primary side by connecting the load to the primary side circuit 12 and the DC power source to the secondary side circuit 14. However, in order to simplify the explanation, as shown in FIG. 1B, a case where the DC power sources are connected to both sides will be described.

In the primary side circuit 12, a bidirectional current switch SW1 disclosed in Patent Document 2 as described above is connected in series between a DC terminal T1 and a DC terminal T2. In the bidirectional current switch SW1, a series circuit of the semiconductor switch Qa and the semiconductor switch Qb, a series circuit of the semiconductor switch Qc and the semiconductor switch Qd, and a capacitor C1 are respectively connected in parallel between the DC terminal T1 and the DC terminal T2. For example, each of the semiconductor switches Qa to Qd may be constituted by a p-channel metal-oxide-semiconductor field-effect transistor (P-MOSFET) and a parasitic diode which is connected in parallel to the P-MOSFET. Further, each of the semiconductor switches Qa to Qd may be configured by an insulated gate bipolar transistor (IGBT) other than the configuration of the P-MOSFET and the parasitic diode.

In the series circuit of the semiconductor switch Qa and the semiconductor switch Qb, a source electrode Sa of the semiconductor switch Qa is connected to a drain electrode Db of the semiconductor switch Qb. In the series circuit of the semiconductor switch Qc and the semiconductor switch Qd, a source electrode Sc of the semiconductor switch Qc is connected to a drain electrode Dd of the semiconductor switch Qd. Further, a drain electrode Da of the semiconductor switch Qa and a drain electrode Dc of the semiconductor switch Qc are respectively connected to the DC terminal T1. Furthermore, a source electrode Sb of the semiconductor switch Qb and a source electrode Sd of the semiconductor switch Qd are respectively connected to the DC terminal T2. Thus, a so-called full bridge circuit is configured.

In the bidirectional current switch SW1, as shown in FIG. 2A, the gate control signals are applied to the gate electrodes Ga to Gd of the semiconductor switches Qa to Qd by a control circuit 15a. Accordingly, the semiconductor switches Qa to Qd perform an on-off operation in response to the gate control signals applied to the gate electrodes Ga to Gd. FIGS. 2A and 2B show examples of the temporal variations when the gate control signals are applied to the gate electrodes Ga to Gh of the semiconductor switches Qa to Qh every 10 μsec.

In the bidirectional current switch SW1, the control circuit 15a applies gate control signals whose phases are synchronized with each other to the gate electrode Ga of the semiconductor switch Qa and the gate electrode Gd of the semiconductor switch Qd located on a diagonal line. Further, the control circuit 15a applies gate control signals whose phases are synchronized with each other to the gate electrode Gb of the semiconductor switch Qb and the gate electrode Gc of the semiconductor switch Qc located on a diagonal line.

An on-duty ratio of the gate control signals applied to the gate electrodes Ga to Gd of the semiconductor switches Qa to Qd is set up to 50% (in practice, e.g., about 49% taking into account the dead time) of one cycle in order to prevent a short circuit of the gate electrodes Ga to Gd. Further, the control circuit 15a does not apply gate control signals to the gate electrode Ga of the semiconductor switch Qa and the gate electrode Gb of the semiconductor switch Qb to be turned on at the same time in any phase. Similarly, the control circuit 15a does not apply gate control signals to the gate electrode Gc of the semiconductor switch Qc and the gate electrode Gd of the semiconductor switch Qd to be turned on at the same time in any phase. This is because a short circuit occurs when a voltage is applied to the capacitor C1.

Further, the capacitor C1 functions as a snubber capacitor in the bidirectional current switch of Patent Document 1 described above, and also functions as a smoothing capacitor for smoothing an AC voltage induced in the primary side circuit 12 through the transformer 13 into a DC voltage when the second DC power source Vb is connected between the terminal Tc and the terminal Td of the secondary side circuit 14.

Further, the first DC power source Va and the resistor R1 are connected in series between the terminal Ta and the terminal Tb. The resistor R1 is a low resistance element provided as an internal resistor of the first DC power source Va.

Further, a first inductor L1 is connected in series between the terminal Ta and the DC terminal T1 such that a current Ia flows toward the first inductor L1 from the first DC power source Va. Hereinafter, as shown in FIG. 1, the direction of the current Ia flowing toward the first inductor L1 from the first DC power source Va is described as a positive direction of the current Ia.

Further, a primary side inductor 13a of the transformer 13 is connected between a terminal T3 which is a connection node of the source electrode Sa of the semiconductor switch Qa and the drain electrode Db of the semiconductor switch Qb, and a terminal T4 which is a connection node of the source electrode Sc of the semiconductor switch Qc and the drain electrode Dd of the semiconductor switch Qd.

Further, in the primary side circuit 12, the electrostatic capacitance of the capacitor C1 and the inductance of the primary side excitation inductor 13a of the transformer 13 are set respectively such that the resonance frequency determined by the capacitor C1 and the primary side excitation inductor 13a of the transformer 13 is higher than the switching frequency of the semiconductor switches Qa to Qd. Accordingly, every time after the capacitor C1 is discharged, there occurs a period in which the voltage across the capacitor C1 is substantially zero. It is possible to achieve soft switching at zero voltage and zero current and reduce the switching losses in the semiconductor switches Qa to Qd in the operation of the bidirectional DC/DC converter 11.

In the secondary side circuit 14, a bidirectional current switch SW2 disclosed in Patent Document 2 described above is connected in series between a DC terminal T5 and a DC terminal T6. In the bidirectional current switch SW2, a series circuit of the semiconductor switch Qf and the semiconductor switch Qe, a series circuit of the semiconductor switch Qg and the semiconductor switch Qh, and a capacitor C2 are respectively connected in parallel between the DC terminal T5 and the DC terminal T6. For example, each of the semiconductor switches Qe to Qh may be constituted by a p-channel metal-oxide-semiconductor field-effect transistor (P-MOSFET) and a parasitic diode which is connected in parallel to the P-MOSFET. Further, each of the semiconductor switches Qe to Qh may be configured by an insulated gate bipolar transistor (IGBT) other than the configuration of the P-MOSFET and the parasitic diode.

In the series circuit of the semiconductor switch Qe and the semiconductor switch Qh, a source electrode Se of the semiconductor switch Qe is connected to a drain electrode Df of the semiconductor switch Qf. Further, in the series circuit of the semiconductor switch Qg and the semiconductor switch Qh, a source electrode Sg of the semiconductor switch Qg is connected to a drain electrode Dh of the semiconductor switch Qh. A drain electrode De of the semiconductor switch Qe and a drain electrode Dg of the semiconductor switch Qg are respectively connected to the DC terminal T5. Further, a source electrode Sf of the semiconductor switch Qf and a source electrode Sh of the semiconductor switch Qh are respectively connected to the DC terminal T6. Thus, a so-called full bridge circuit is configured.

In the bidirectional current switch SW2, as shown in FIG. 2B, the gate control signals are applied to the gate electrodes Ge to Gh of the semiconductor switches Qe to Qh from a control circuit 15b. Accordingly, the semiconductor switches Qe to Qh perform an on-off operation in response to the gate control signals applied to the gate electrodes Ge to Gh.

In the bidirectional current switch SW2, the control circuit 15b applies gate control signals whose phases are synchronized with each other to the gate electrode Gf of the semiconductor switch Qf and the gate electrode Gg of the semiconductor switch Qg located on a diagonal line. Further, the control circuit 15b applies gate control signals whose phases are synchronized with each other to the gate electrode Ge of the semiconductor switch Qe and the gate electrode Gh of the semiconductor switch Qh located on a diagonal line.

An on-duty ratio of the gate control signals applied to the gate electrodes Ge to Gh of the semiconductor switches Qe to Qh is set up to 50% (in practice, e.g., about 49% taking into account the dead time) of one cycle in order to prevent a short circuit of the gate electrodes Ge to Gh. Further, the control circuit 15b does not apply gate control signals to the gate electrode Ge of the semiconductor switch Qe and the gate electrode Gf of the semiconductor switch Qf to be turned on at the same time in any phase. Similarly, the control circuit 15b does not apply gate control signals to the gate electrode Gg of the semiconductor switch Qg and the gate electrode Gh of the semiconductor switch Qh to be turned on at the same time in any phase. This is why a short circuit occurs when there is a voltage across the capacitor C1.

Further, the capacitor C1 functions as a snubber capacitor in the bidirectional current switch disclosed in Patent Document 1 described above, and also functions as a smoothing capacitor for smoothing an AC voltage induced in the secondary side circuit 14 through the transformer 13 into a DC voltage when the first DC power source Va is connected between the terminal Ta and the terminal Tb of the primary side circuit 12.

Furthermore, the second DC power source Vb and the resistor R2 are connected in series between the terminal Tc and the terminal Td. The resistor R2 is a low resistance element provided as an internal resistor of the second DC power source Vb.

A second inductor L2 is connected in series between the terminal Tc and the DC terminal T5 such that a current Ib flows toward the second inductor L2 from the second DC power source Vb. Hereinafter, as shown in FIG. 1, the direction of the current Ia flowing toward the second inductor L2 from the second DC power source Vb is described as a positive direction of the current Ib.

A secondary side inductor 13b of the transformer 13 is connected between a terminal T7 which is a connection node of the source electrode Se of the semiconductor switch Qe and the drain electrode Df of the semiconductor switch Qf, and a terminal T8 which is a connection node of the source electrode Sg of the semiconductor switch Qg and the drain electrode Dh of the semiconductor switch Qh.

In the secondary side circuit 14, the electrostatic capacitance of the capacitor C2 and the inductance of the secondary side excitation inductor 13b of the transformer 13 are set respectively such that the resonance frequency determined by the capacitor C2 and the secondary side excitation inductor 13b of the transformer 13 is higher than the switching frequency of the semiconductor switches Qe to Qh. Accordingly, every time after the capacitor C2 is discharged, there occurs a period in which the voltage across the capacitor C2 is substantially zero. It is possible to achieve soft switching at zero voltage and zero current and reduce the switching losses in the semiconductor switches Qe to Qh in the operation of the bidirectional DC/DC converter 11.

As shown in FIGS. 2A and 2B, the control circuit 15a and the control circuit 15b respectively apply the gate control signals whose phases are synchronized with each other to the gate electrode Ga of the semiconductor switch Qa, the gate electrode Gd of the semiconductor switch Qd, the gate electrode Gf of the semiconductor switch Qf, and the gate electrode Gg of the semiconductor switch Qg. Further, the control circuit 15a and the control circuit 15b respectively apply the gate control signals whose phases are synchronized with each other to the gate electrode Gb of the semiconductor switch Qb, the gate electrode Gc of the semiconductor switch Qc, the gate electrode Ge of the semiconductor switch Qe, and the gate electrode Gh of the semiconductor switch Qh.

In the bidirectional DC/DC converter 11, the control circuit 15a applies the gate control signals to the gate electrodes Gb and Gc to turn on the semiconductor switches Qb and Qc according to the on-duty ratio of the cycle described above. In addition, in synchronization with the application of the gate control signals to the gate electrodes Gb and Gc by the control circuit 15a, the control circuit 15b respectively applies the gate control signals to the gate electrodes Ge and Gh to turn on the semiconductor switches Qe and Gh according to the on-duty ratio of the cycle described above.

Further, immediately after stopping the application of the gate control signals to the gate electrodes Gb and Gc according to the on-duty ratio of the cycle described above, similarly, the control circuit 15a applies the gate control signals to the gate electrodes Ga and Gd to turn on the semiconductor switches Qa and Qd according to the on-duty ratio of the cycle described above. In addition, immediately after stopping the application of the gate control signals to the gate electrodes Ge and Gh according to the on-duty ratio of the cycle described above, similarly, the control circuit 15b assigns the gate control signals to the gate electrodes Gf and Gg to turn on the semiconductor switches Qf and Qg according to the on-duty ratio of the cycle described above in synchronization with the application of the gate control signals to the gate electrodes Ga and Gd by the control circuit 15a. As shown in FIGS. 2A and 2B, the control circuit 15a and the control circuit 15b repeat these operations.

Thus, an alternating current flows through the primary side inductor 13a of the transformer 13, and an induced voltage transformed by the transformer 13 in accordance with a transformation ratio determined by the primary side inductor 13a and the secondary side inductor 13b is applied to the secondary side circuit 14.

Further, in the bidirectional DC/DC converter 11, it is possible to appropriately switch between the power supply from the primary side circuit 12 to the secondary side circuit 14 and the power supply from the secondary side circuit 14 to the primary side circuit 12 according to the on-duty ratio of the gate control signals outputted by the control circuit 15a and the control circuit 15b respectively. For example, if the on-duty ratio of the gate control signals applied to the gate electrodes Ga to Gd of the semiconductor switches Qa to Qd from the control circuit 15a in the primary side circuit 12 is greater than the on-duty ratio of the gate control signals applied to the gate electrodes Ge to Gh of the semiconductor switches Qe to Qh from the control circuit 15b in the secondary side circuit 14, the bidirectional DC/DC converter 11 performs the power supply from the primary side circuit 12 to the secondary side circuit 14.

On the other hand, if the on-duty ratio of the gate control signals applied to the gate electrodes Ga to Gd of the semiconductor switches Qa to Qd from the control circuit 15a in the primary side circuit 12 is smaller than the on-duty ratio of the gate control signals applied to the gate electrodes Ge to Gh of the semiconductor switches Qe to Qh from the control circuit 15b in the secondary side circuit 14, the bidirectional DC/DC converter 11 performs the power supply from the secondary side circuit 14 to the primary side circuit 12.

In the next, operation simulation of the bidirectional DC/DC converter 11 will be described in a case where step-down ratio of the transformer 13 is 1:1.

Figure 3:
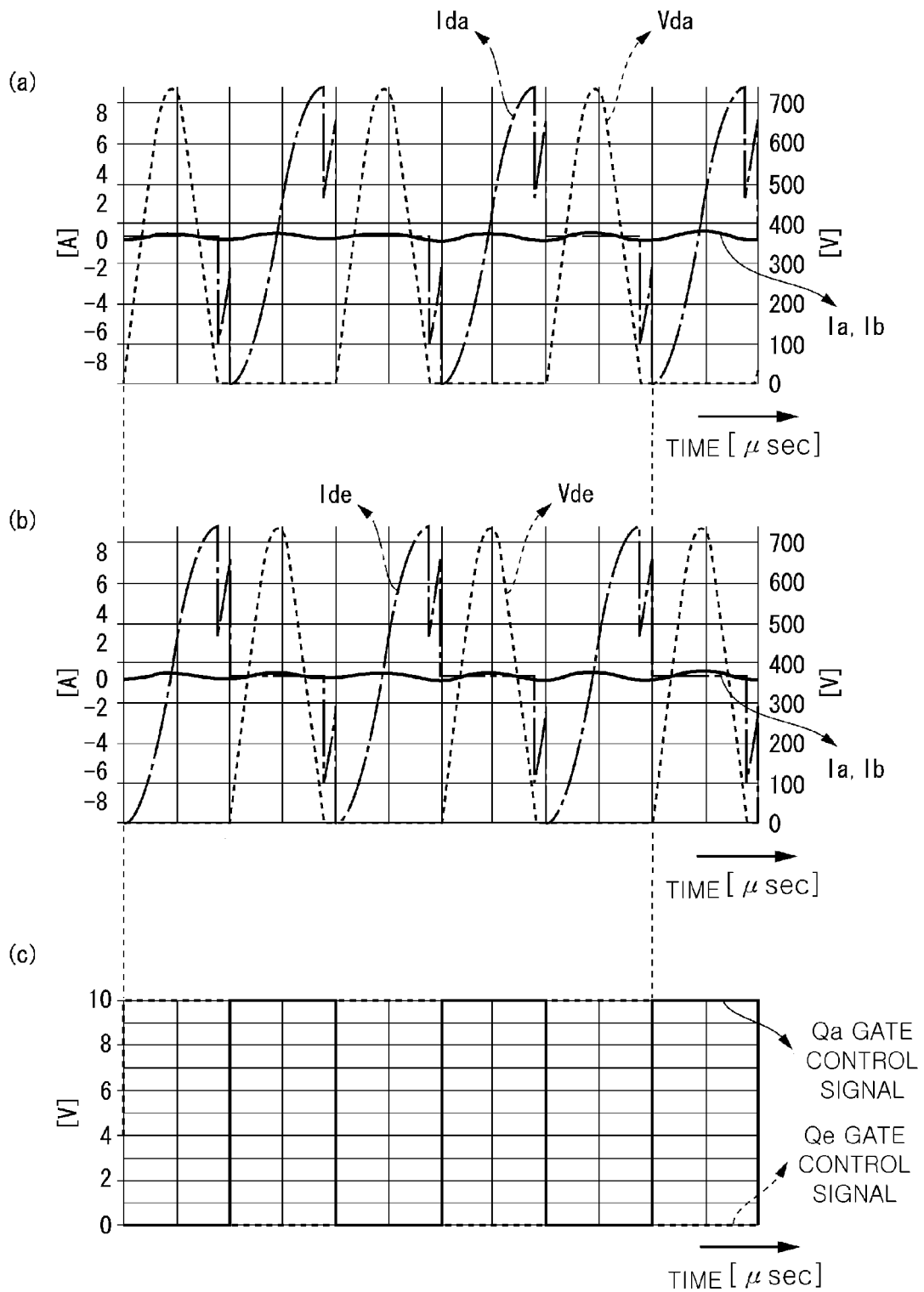
FIG. 3 depicts explanatory diagrams showing examples of simulation result 1 under operation condition 1, wherein (a) is an explanatory diagram showing an example of temporal variations of a drain current Ida and a drain voltage Vda of the semiconductor switch Qa, a current Ia, and a current Ib, (b) is an explanatory diagram showing an example of temporal variations of a drain current Ide and a drain voltage Vde of the semiconductor switch Qe, the current Ia, and the current Ib, and (c) is an explanatory diagram showing an example of temporal variations of the gate control signal applied to the gate electrode Ga of the semiconductor switch Qa and the gate control signal applied to the gate electrode Ge of the semiconductor switch Qe.
Figure 4:
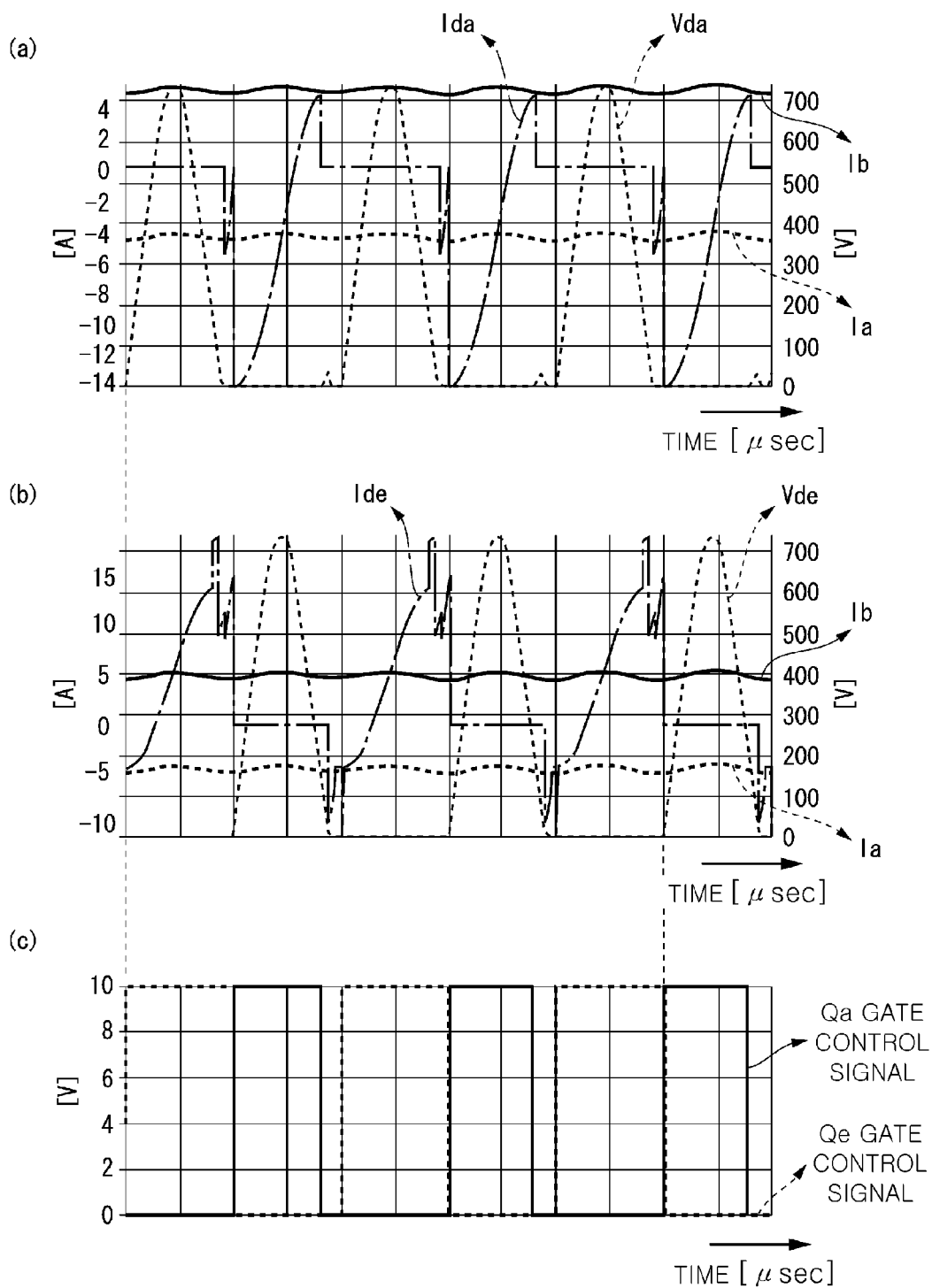
FIG. 4 illustrates explanatory diagrams showing examples of simulation result 2 under operation condition 2, wherein (a) is an explanatory diagram showing an example of temporal variations of the drain current Ida and the drain voltage Vda of the semiconductor switch Qa, the current Ia, and the current Ib, (b) is an explanatory diagram showing an example of temporal variations of the drain current Ide and the drain voltage Vde of the semiconductor switch Qe, the current Ia, and the current Ib, and (c) is an explanatory diagram showing an example of temporal variations of the gate control signal applied to the gate electrode Ga of the semiconductor switch Qa and the gate control signal applied to the gate electrode Ge of the semiconductor switch Qe.
Figure 5:
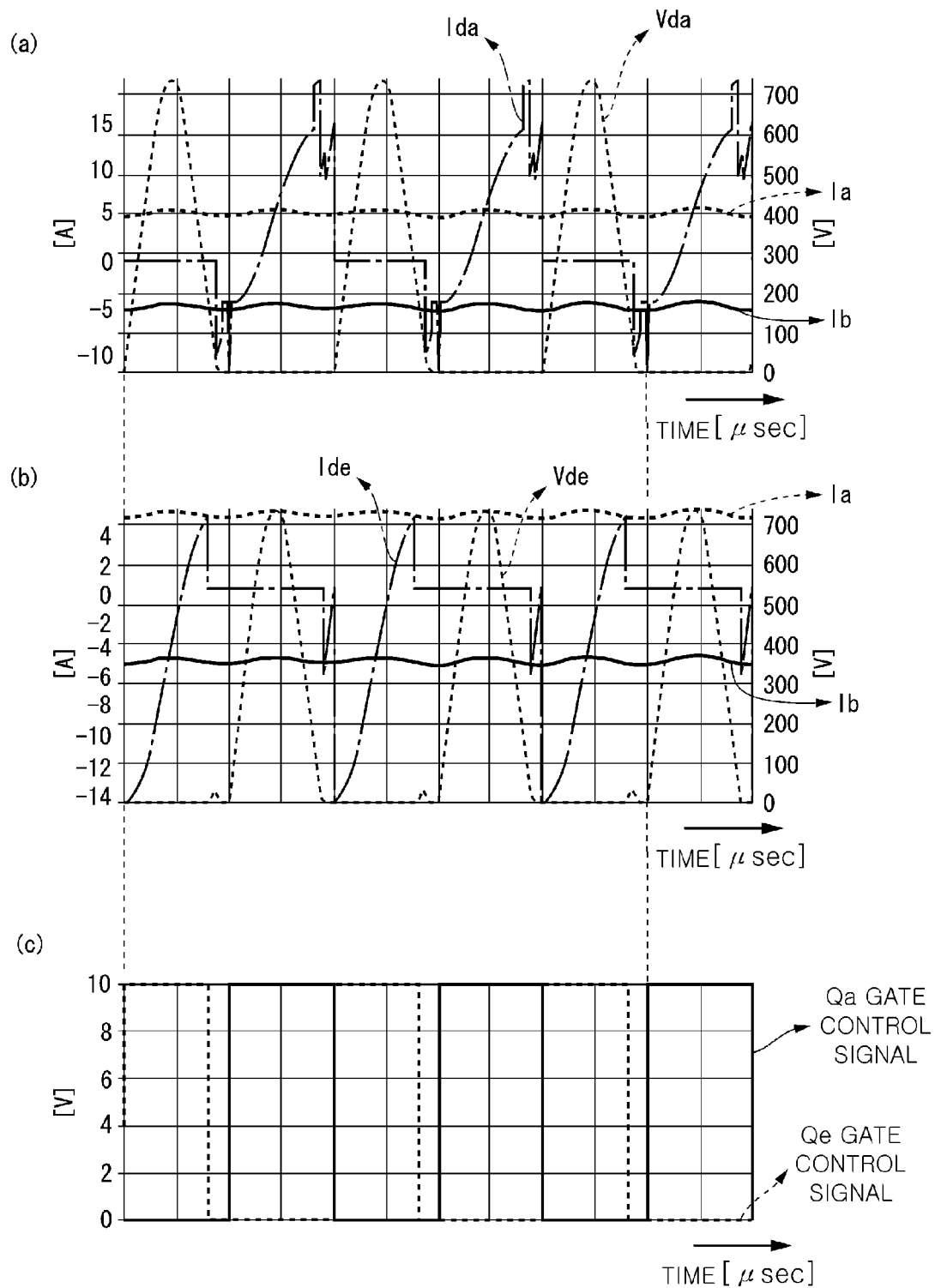
FIG. 5 illustrates explanatory diagrams showing examples of simulation result 3 under operation condition 3, wherein (a) is an explanatory diagram showing an example of temporal variations of the drain current Ida and the drain voltage Vda of the semiconductor switch Qa, the current Ia, and the current Ib, (b) is an explanatory diagram showing an example of temporal variations of the drain current Ide and the drain voltage Vde of the semiconductor switch Qe, the current Ia, and the current Ib, and (c) is an explanatory diagram showing an example of temporal variations of the gate control signal applied to the gate electrode Ga of the semiconductor switch Qa and the gate control signal applied to the gate electrode Ge of the semiconductor switch Qe.

FIGS. 3 to 5 are explanatory diagrams illustrating simulation results 1 to 3 under operation conditions 1 to 3 of the bidirectional DC/DC converter 11 in accordance with the first embodiment.

First, a description will be given of the simulation result 1 under the operation condition 1. The operation condition 1 shown in FIG. 3 is described below. FIG. 3 illustrates explanatory diagrams showing examples of the simulation result 1 under the operation condition 1. In FIG. 3, (a) is an explanatory diagram showing an example of temporal variations of a drain current Ida and a drain voltage Vda of the semiconductor switch Qa, the current Ia flowing through the first inductor L1, and the current Ib flowing through the second inductor L2. In FIG. 3, (b) is an explanatory diagram showing an example of temporal variations of a drain current Ide and a drain voltage Vde of the semiconductor switch Qe, the current Ia flowing through the first inductor L1, and the current Ib flowing through the second inductor L2. In FIG. 3, (c) is an explanatory diagram showing an example of temporal variations of the gate control signal applied to the gate electrode Ga of the semiconductor switch Qa and the gate control signal applied to the gate electrode Ge of the semiconductor switch Qe.

(1) The first DC power source Va is connected to the primary side circuit 12, and the second DC power source Vb is connected to the secondary side circuit 14.

(2) Voltage of the first DC power source Va: 380 [V]

(3) Voltage of the second DC power source Vb: 380 [V]

(4) On-duty ratio of the semiconductor switches Qa to Qd: 49% of one cycle (Off-duty ratio is 51% of one cycle)

(5) On-duty ratio of the semiconductor switches Qe to Qh: 49% of one cycle (Off-duty ratio is 51% of one cycle)

(6) Step-down ratio of the transformer 13: the primary side circuit 12 and the secondary side circuit 14 have a relationship of 1:1.

In (a), (b) and (c) of FIG. 3, a horizontal axis represents time (2.5 μsec/1 div). A dotted line waveform of (a) of FIG. 3 represents the drain current Ida [A] of the semiconductor switch Qa for the gate control signal applied to the gate electrode Ga of the semiconductor switch Qa. A dashed dotted line waveform of (a) of FIG. 3 represents the drain voltage Vda [V] of the semiconductor switch Qa for the gate control signal applied to the gate electrode Ga of the semiconductor switch Qa. A dotted line waveform of (b) of FIG. 3 represents the drain current Ide [A] of the semiconductor switch Qe for the gate control signal applied to the gate electrode Ge of the semiconductor switch Qe. A dashed dotted line waveform of (b) of FIG. 3 represents the drain voltage Vde [V] of the semiconductor switch Qe for the gate control signal applied to the gate electrode Ge of the semiconductor switch Qe.

As shown in (c) of FIG. 3, since the gate control signal applied to the gate electrode Ga of the semiconductor switch Qa and the gate control signal applied to the gate electrode Ge of the semiconductor switch Qe have the same on-duty ratio, the gate control signals are respectively outputted by the control circuit 15a and the control circuit 15b such that the phase of each gate control signal is simply inverted. That is, the semiconductor switch Qe is turned off while the semiconductor switch Qa is turned on, and the semiconductor switch Qa is turned off while the semiconductor switch Qe is turned on. In (c) of FIG. 3, among the eight semiconductor switches Qa to Qh, the cases of the semiconductor switch Qa and the semiconductor switch Qe are illustrated representatively in the bidirectional current switch SW1 and the bidirectional current switch SW2. However, the gate control signals of the other semiconductor switches Qb to Qd and Qf to Qh are shown in FIG. 2 when the on-duty ratio is 49%.

As shown in (a) and (b) of FIG. 3, the current Ia and the current Ib are substantially zero. Accordingly, under the operation condition 1, i.e., in the case where the on-duty ratio of the semiconductor switches Qa to Qd is 49% substantially identical to the on-duty ratio of the semiconductor switches Qe to Qh, it is shown that the current Ia and the current Ib do not flow in the bidirectional DC/DC converter 11.

Further, as shown in (a) and (b) of FIG. 3, the waveforms of the drain current Ida and the drain voltage Vda of the semiconductor switch Qa, and the waveforms of the drain current Ide and the drain voltage Vde of the semiconductor switch Qe do not overlap each other. Accordingly, it is shown that the switching losses of the semiconductor switch Qa and the semiconductor switch Qe can be reduced in the bidirectional DC/DC converter 11. Similarly, the switching losses of the other semiconductor switches Qb to Qd and Qf to Qh can be reduced.

Next, a description will be given of the simulation result 2 under the operation condition 2. The operation condition 2 shown in FIG. 4 is described below. FIG. 4 illustrates explanatory diagrams showing examples of the simulation result 2 under the operation condition 2. In FIG. 4, (a) is an explanatory diagram showing an example of temporal variations of the drain current Ida and the drain voltage Vda of the semiconductor switch Qa, the current Ia flowing through the first inductor L1, and the current Ib flowing through the second inductor L2.

In FIG. 4, (b) is an explanatory diagram showing an example of temporal variations of the drain current Ide and the drain voltage Vde of the semiconductor switch Qe, the current Ia flowing through the first inductor L1, and the current Ib flowing through the second inductor L2. In FIG. 4, (c) is an explanatory diagram showing an example of temporal variations of the gate control signal applied to the gate electrode Ga of the semiconductor switch Qa and the gate control signal applied to the gate electrode Ge of the semiconductor switch Qe.

(1) The first DC power source Va is connected to the primary side circuit 12, and the second DC power source Vb is connected to the secondary side circuit 14.

(2) Voltage of the first DC power source Va: 380 [V]

(3) Voltage of the second DC power source Vb: 380 [V]

(4) On-duty ratio of the semiconductor switches Qa to Qd: 40% of one cycle (Off-duty ratio is 60% of one cycle)

(5) On-duty ratio of the semiconductor switches Qe to Qh: 49% of one cycle (Off-duty ratio is 51% of one cycle)

(6) Step-down ratio of the transformer 13: the primary side circuit 12 and the secondary side circuit 14 have a relationship of 1:1.

In (a), (b) and (c) of FIG. 4, a horizontal axis represents time (2.5 μsec/1 div). A dotted line waveform of (a) of FIG. 4 represents the drain current Ida [A] of the semiconductor switch Qa for the gate control signal applied to the gate electrode Ga of the semiconductor switch Qa. A dashed dotted line waveform of (a) of FIG. 4 represents the drain voltage Vda [V] of the semiconductor switch Qa for the gate control signal applied to the gate electrode Ga of the semiconductor switch Qa. A dotted line waveform of (b) of FIG. 4 represents the drain current Ide [A] of the semiconductor switch Qe for the gate control signal applied to the gate electrode Ge of the semiconductor switch Qe. A dashed dotted line waveform of (b) of FIG. 4 represents the drain voltage Vde [V] of the semiconductor switch Qe for the gate control signal applied to the gate electrode Ge of the semiconductor switch Qe.

As shown in (c) of FIG. 4, the gate control signal applied to the gate electrode Ga of the semiconductor switch Qa and the gate control signal applied to the gate electrode Ge of the semiconductor switch Qe have different on-duty ratios. Specifically, as described in (4) of the operation condition 2, the on-duty ratio of the semiconductor switches Qa to Qd is 40% of one cycle, and as described in (5) of the operation condition 2, the on-duty ratio of the semiconductor switches Qe to Qh is 49% of one cycle. Further, similarly to the operation condition 1, in (c) of FIG. 4, among the eight semiconductor switches Qa to Qh, the cases of the semiconductor switch Qa and the semiconductor switch Qe are illustrated representatively in the bidirectional current switch SW1 and the bidirectional current switch SW2.

As shown in (a) and (b) of FIG. 4, as the simulation result 2 under the operation condition 2, the current Ia changes in negative values, and the current Ib changes in positive values. Thus, as seen from the simulation result 2 under the operation condition 2, the bidirectional DC/DC converter 11 of the first embodiment supplies the converted power from the secondary side circuit 14 (second DC power source Vb) in which the on-duty ratio of the gate control signal is large to the primary side circuit 12 (first DC power source Va) in which the on-duty ratio is small.

Further, as shown in (a) and (b) of FIG. 4, the waveforms of the drain current Ida and the drain voltage Vda of the semiconductor switch Qa, and the waveforms of the drain current Ide and the drain voltage Vde of the semiconductor switch Qe do not overlap each other. Accordingly, it is shown that the switching losses of the semiconductor switch Qa and the semiconductor switch Qe can be reduced in the bidirectional DC/DC converter 11. Similarly, the switching losses of the other semiconductor switches Qb to Qd and Qf to Qh can be reduced.

Next, a description will be given of the simulation result 3 under the operation condition 3. The operation condition 3 shown in FIG. 5 is described below. FIG. 5 illustrates explanatory diagrams showing examples of the simulation result 3 under the operation condition 3. In FIG. 5, (a) is an explanatory diagram showing an example of temporal variations of the drain current Ida and the drain voltage Vda of the semiconductor switch Qa, the current Ia flowing through the first inductor L1, and the current Ib flowing through the second inductor L2.

In FIG. 5, (b) is an explanatory diagram showing an example of temporal variations of the drain current Ide and the drain voltage Vde of the semiconductor switch Qe, the current Ia flowing through the first inductor L1, and the current Ib flowing through the second inductor L2. In FIG. 5, (c) is an explanatory diagram showing an example of temporal variations of the gate control signal applied to the gate electrode Ga of the semiconductor switch Qa and the gate control signal applied to the gate electrode Ge of the semiconductor switch Qe.

(1) The first DC power source Va is connected to the primary side circuit 12, and the second DC power source Vb is connected to the secondary side circuit 14.
(2) Voltage of the first DC power source Va: 380 [V]
(3) Voltage of the second DC power source Vb: 380 [V]
(4) On-duty ratio of the semiconductor switches Qa to Qd: 49% of one cycle (Off-duty ratio is 51% of one cycle)
(5) On-duty ratio of the semiconductor switches Qe to Qh: 40% of one cycle (Off-duty ratio is 60% of one cycle)
(6) Step-down ratio of the transformer 13: the primary side circuit 12 and the secondary side circuit 14 have a relationship of 1:1.

In (a), (b) and (c) of FIG. 5, a horizontal axis represents time (2.5 μsec/1 div). A dotted line waveform of (a) of FIG. 5 represents the drain current Ida [A] of the semiconductor switch Qa for the gate control signal applied to the gate electrode Ga of the semiconductor switch Qa. A dashed dotted line waveform of (a) of FIG. 5 represents the drain voltage Vda [V] of the semiconductor switch Qa for the gate control signal applied to the gate electrode Ga of the semiconductor switch Qa. A dotted line waveform of (b) of FIG. 5 represents the drain current Ide [A] of the semiconductor switch Qe for the gate control signal applied to the gate electrode Ge of the semiconductor switch Qe. A dashed dotted line waveform of (b) of FIG. 5 represents the drain voltage Vde [V] of the semiconductor switch Qe for the gate control signal applied to the gate electrode Ge of the semiconductor switch Qe.

As shown in (c) of FIG. 5, the gate control signal applied to the gate electrode Ga of the semiconductor switch Qa and the gate control signal applied to the gate electrode Ge of the semiconductor switch Qe have different on-duty ratios. Specifically, as described in (4) of the operation condition 3, the on-duty ratio of the semiconductor switches Qa to Qd is 49% of one cycle, and as described in (5) of the operation condition 3, the on-duty ratio of the semiconductor switches Qe to Qh is 40% of one cycle. Further, similarly to the operation condition 1, in (c) of FIG. 5, the cases of the semiconductor switch Qa and the semiconductor switch Qe among the eight semiconductor switches Qa to Qh are illustrated representatively in the bidirectional current switch SW1 and the bidirectional current switch SW2.

As shown in (a) and (c) of FIG. 5, the current Ib changes in negative values, and the current Ia changes in positive values. Thus, as seen from the simulation result 3 under the operation simulation condition 3, the bidirectional DC/DC converter 11 of the first embodiment supplies the converted power from the primary side circuit (first DC power source Va) in which the on-duty ratio of the gate control signal is large to the secondary side circuit 14 (second DC power source Vb) in which the on-duty ratio is small.

Further, as shown in (a) and (b) of FIG. 5, the waveforms of the drain current Ida and the drain voltage Vda of the semiconductor switch Qa, and the waveforms of the drain current Ide and the drain voltage Vde of the semiconductor switch Qe do not overlap each other. Accordingly, it is shown that the switching losses of the semiconductor switch Qa and the semiconductor switch Qe can be reduced in the bidirectional DC/DC converter 11. Similarly, the switching losses of the other semiconductor switches Qb to Qd and Qf to Qh can be reduced.

Next, operation simulation of the bidirectional DC/DC converter 11 will be described in a case where step-down ratio of the transformer 13 is 1:0.2.

Figure 6:
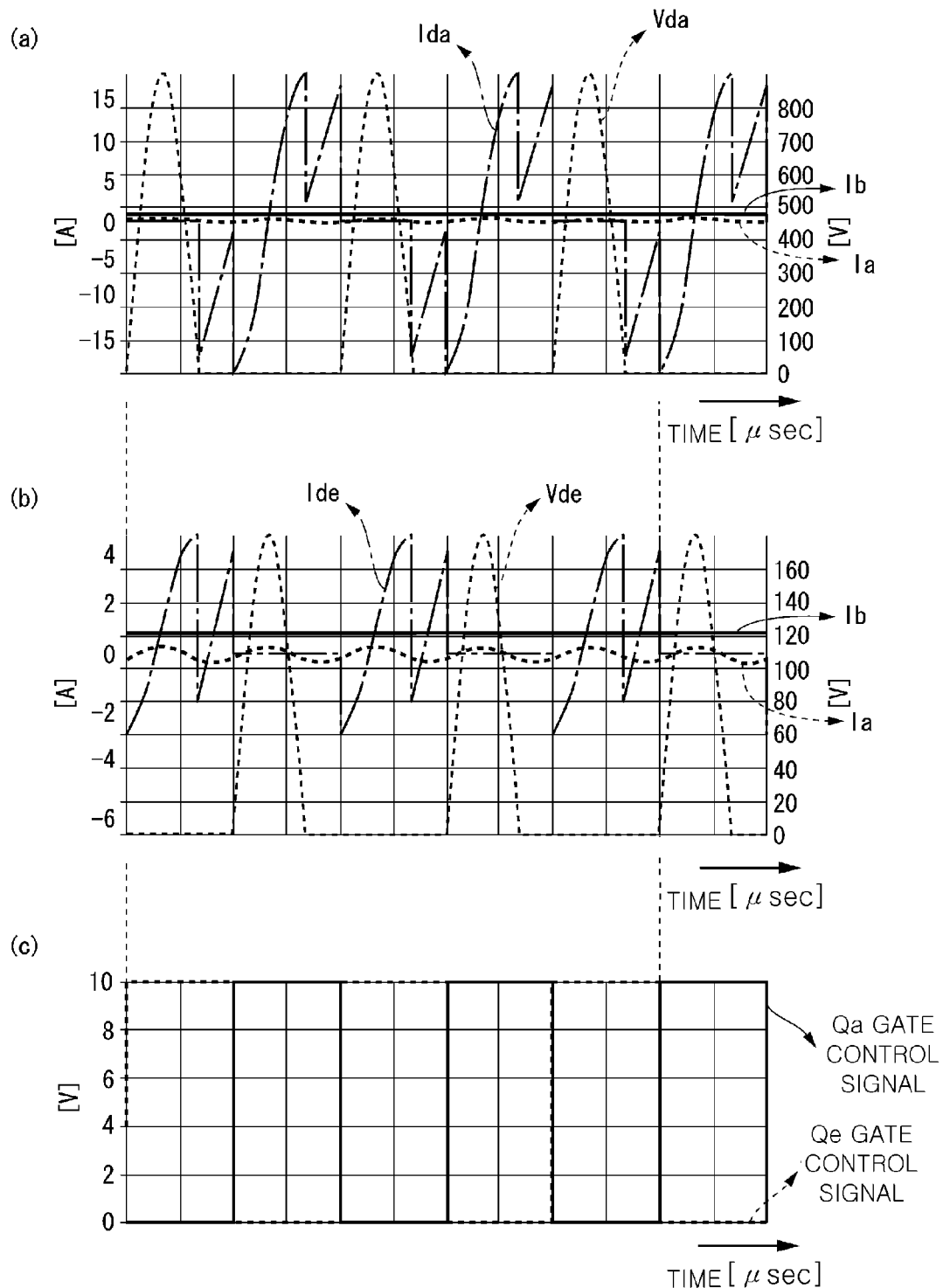
FIG. 6 illustrates explanatory diagrams showing examples of simulation result 4 under operation condition 4, wherein (a) is an explanatory diagram showing an example of temporal variations of the drain current Ida and the drain voltage Vda of the semiconductor switch Qa, the current Ia, and the current Ib, (b) is an explanatory diagram showing an example of temporal variations of the drain current Ide and the drain voltage Vde of the semiconductor switch Qe, the current Ia, and the current Ib, and (c) is an explanatory diagram showing an example of temporal variations of the gate control signal applied to the gate electrode Ga of the semiconductor switch Qa and the gate control signal applied to the gate electrode Ge of the semiconductor switch Qe.
Figure 7:
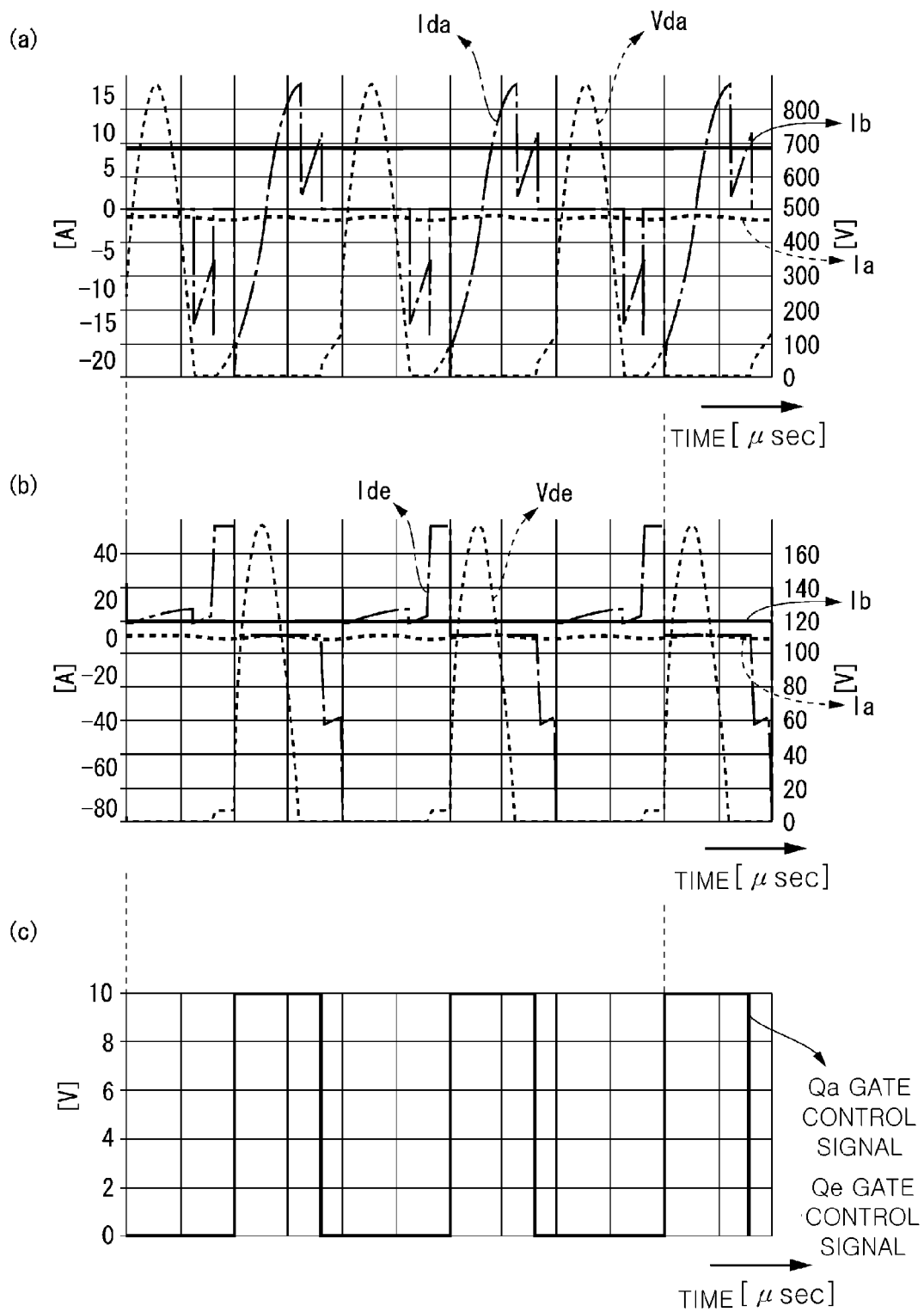
FIG. 7 illustrates explanatory diagrams showing examples of simulation result 5 under operation condition 5, wherein (a) is an explanatory diagram showing an example of temporal variations of the drain current Ida and the drain voltage Vda of the semiconductor switch Qa, the current Ia, and the current Ib, (b) is an explanatory diagram showing an example of temporal variations of the drain current Ide and the drain voltage Vde of the semiconductor switch Qe, the current Ia, and the current Ib, and (c) is an explanatory diagram showing an example of temporal variations of the gate control signal applied to the gate electrode Ga of the semiconductor switch Qa and the gate control signal applied to the gate electrode Ge of the semiconductor switch Qe.
Figure 8:
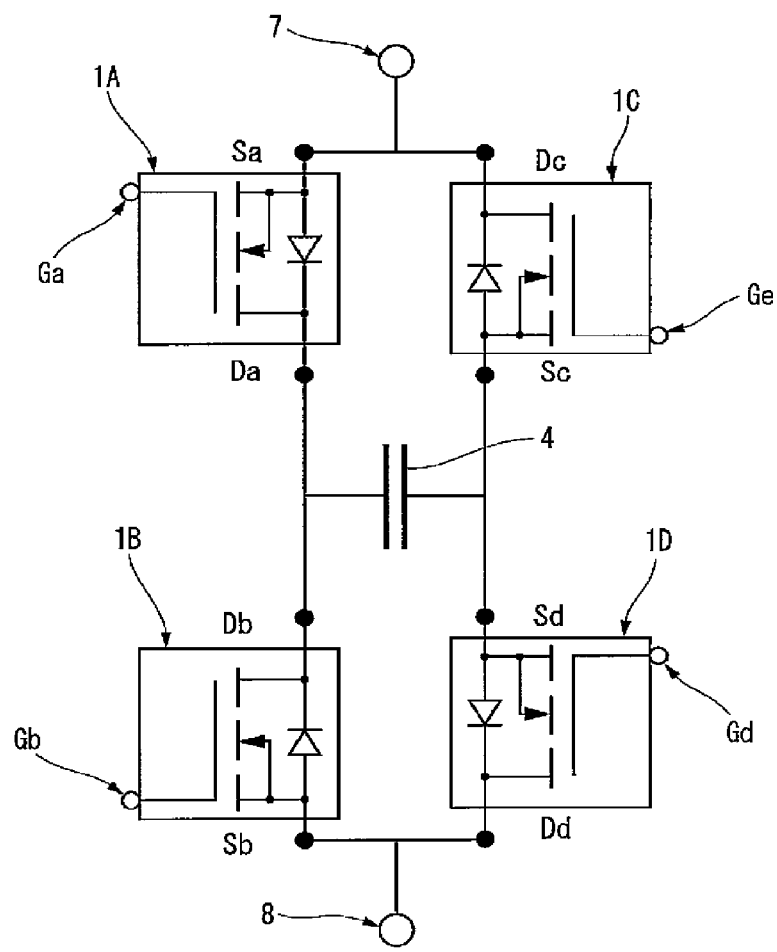
FIG. 8 is an explanatory diagram showing a circuit configuration of a conventional bidirectional current switch.

FIGS. 6 and 7 are explanatory diagrams illustrating simulation results 4 and 5 under operation conditions 4 and of the bidirectional DC/DC converter 11 of the first embodiment.

First, a description will be given of the simulation result 4 under the operation condition 4. The operation condition 4 shown in FIG. 6 is described below. FIG. 6 illustrates explanatory diagrams showing examples of the simulation result 4 under the operation condition 4. In FIG. 6, (a) is an explanatory diagram showing an example of temporal variations of a drain current Ida and a drain voltage Vda of the semiconductor switch Qa, the current Ia flowing through the first inductor L1, and the current Ib flowing through the second inductor L2.

In FIG. 6, (b) is an explanatory diagram showing an example of temporal variations of the drain current Ide and the drain voltage Vde of the semiconductor switch Qe, the current Ia flowing through the first inductor L1, and the current Ib flowing through the second inductor L2. In FIG. 6, (c) is an explanatory diagram showing an example of temporal variations of the gate control signal applied to the gate electrode Ga of the semiconductor switch Qa and the gate control signal applied to the gate electrode Ge of the semiconductor switch Qe.

(1) The first DC power source Va is connected to the primary side circuit 12, and the second DC power source Vb is connected to the secondary side circuit 14.

(2) Voltage of the first DC power source Va: 380 [V]

(3) Voltage of the second DC power source Vb: 76 [V]

(4) On-duty ratio of the semiconductor switches Qa to Qd: 49% of one cycle (Off-duty ratio is 51% of one cycle)

(5) On-duty ratio of the semiconductor switches Qe to Qh: 49% of one cycle (Off-duty ratio is 51% of one cycle)

(6) Step-down ratio of the transformer 13: the primary side circuit 12 and the secondary side circuit 14 have a relationship of 1:0.2.

In (a), (b) and (c) of FIG. 6, a horizontal axis represents time (2.5 μsec/1 div). A dotted line waveform of (a) of FIG. 6 represents the drain current Ida [A] of the semiconductor switch Qa for the gate control signal applied to the gate electrode Ga of the semiconductor switch Qa. A dashed dotted line waveform of (a) of FIG. 6 represents the drain voltage Vda [V] of the semiconductor switch Qa for the gate control signal applied to the gate electrode Ga of the semiconductor switch Qa. A dotted line waveform of (b) of FIG. 6 represents the drain current Ide [A] of the semiconductor switch Qe for the gate control signal applied to the gate electrode Ge of the semiconductor switch Qe. A dashed dotted line waveform of (b) of FIG. 6 represents the drain voltage Vde [V] of the semiconductor switch Qe for the gate control signal applied to the gate electrode Ge of the semiconductor switch Qe.

As shown in (c) of FIG. 6, since the gate control signal applied to the gate electrode Ga of the semiconductor switch Qa and the gate control signal applied to the gate electrode Ge of the semiconductor switch Qe have the same on-duty ratio, the gate control signals are respectively outputted by the control circuit 15a and the control circuit 15b such that the phase of each gate control signal is simply inverted. That is, the semiconductor switch Qe is turned off while the semiconductor switch Qa is turned on, and the semiconductor switch Qa is turned off while the semiconductor switch Qe is turned on. In (c) of FIG. 6, the cases of the semiconductor switch Qa and the semiconductor switch Qe among the eight semiconductor switches Qa to Qh are illustrated representatively in the bidirectional current switch SW1 and the bidirectional current switch SW2. However, the gate control signals of the other semiconductor switches Qb to Qd and Qf to Qh are shown in FIG. 2 when the on-duty ratio is 49%.

As shown in (a) and (b) of FIG. 6, there is a slight difference in the magnitude of the current Ia and the current Ib, and it is considered that this difference appears due to the effect of the step-down ratio of the transformer 13. Accordingly, similarly to the simulation result 1 under the operation condition 1, in the operation simulation condition 4, i.e., in the case where the on-duty ratio of the semiconductor switches Qa to Qd is 49% substantially identical to the on-duty ratio of the semiconductor switches Qe to Qh, it is shown that the current Ia and the current Ib do not flow in the bidirectional DC/DC converter 11.

Further, as shown in (a) and (b) of FIG. 6, the waveforms of the drain current Ida and the drain voltage Vda of the semiconductor switch Qa, and the waveforms of the drain current Ide and the drain voltage Vde of the semiconductor switch Qe do not overlap each other. Accordingly, it is shown that the switching losses of the semiconductor switch Qa and the semiconductor switch Qe can be reduced in the bidirectional DC/DC converter 11. Similarly, the switching losses of the other semiconductor switches Qb to Qd and Qf to Qh can be reduced.

Finally, a description will be given of the simulation result 5 under the operation condition 5. The operation condition 5 shown in FIG. 7 is described below. FIG. 7 illustrates explanatory diagrams showing examples of the simulation result 5 under the operation condition 5. In FIG. 7, (a) is an explanatory diagram showing an example of temporal variations of the drain current Ida and the drain voltage Vda of the semiconductor switch Qa, the current Ia flowing through the first inductor L1, and the current Ib flowing through the second inductor L2.

In FIG. 7, (b) is an explanatory diagram showing an example of temporal variations of the drain current Ide and the drain voltage Vde of the semiconductor switch Qe, the current Ia flowing through the first inductor L1, and the current Ib flowing through the second inductor L2. In FIG. 7, (c) is an explanatory diagram showing an example of temporal variations of the gate control signal applied to the gate electrode Ga of the semiconductor switch Qa and the gate control signal applied to the gate electrode Ge of the semiconductor switch Qe.

(1) The first DC power source Va is connected to the primary side circuit 12, and the second DC power source Vb is connected to the secondary side circuit 14.

(2) Voltage of the first DC power source Va: 380 [V]

(3) Voltage of the second DC power source Vb: 76 [V]

(4) On-duty ratio of the semiconductor switches Qa to Qd: 40% of one cycle (Off-duty ratio is 60% of one cycle)

(5) On-duty ratio of the semiconductor switches Qe to Qh: 49% of one cycle (Off-duty ratio is 51% of one cycle)

(6) Step-down ratio of the transformer 13: 1:0.2 (which is a relationship of the primary side circuit 12 and the secondary side circuit 14)

In (a), (b) and (c) of FIG. 7, a horizontal axis represents time (2.5 μsec/1 div). A dotted line waveform of (a) of FIG. 7 represents the drain current Ida [A] of the semiconductor switch Qa for the gate control signal applied to the gate electrode Ga of the semiconductor switch Qa. A dashed dotted line waveform of (a) of FIG. 7 represents the drain voltage Vda [V] of the semiconductor switch Qa for the gate control signal applied to the gate electrode Ga of the semiconductor switch Qa. A dotted line waveform of (b) of FIG. 7 represents the drain current Ide [A] of the semiconductor switch Qe for the gate control signal applied to the gate electrode Ge of the semiconductor switch Qe. A dashed dotted line waveform of (e) of FIG. 7 represents the drain voltage Vde [V] of the semiconductor switch Qe for the gate control signal applied to the gate electrode Ge of the semiconductor switch Qe.

As shown in (c) of FIG. 7, the gate control signal applied to the gate electrode Ga of the semiconductor switch Qa and the gate control signal applied to the gate electrode Ge of the semiconductor switch Qe have different on-duty ratios. Specifically, as described in (4) of the operation condition 5, the on-duty ratio of the semiconductor switches Qa to Qd is 40% of one cycle, and as described in (5) of the operation condition 5, the on-duty ratio of the semiconductor switches Qe to Qh is 49% of one cycle. Further, as in the operation condition 1, in (c) of FIG. 7, the cases of the semiconductor switch Qa and the semiconductor switch Qe among the eight semiconductor switches Qa to Qh are illustrated representatively in the bidirectional current switch SW1 and the bidirectional current switch SW2.

As shown in (a) and (b) of FIG. 7, the current Ia changes in negative values, and the current Ib changes in positive values. Thus, as seen from the simulation result 5 under the operation condition 5, the bidirectional DC/DC converter 11 of the first embodiment supplies the converted power from the secondary side circuit 14 (second DC power source Vb) in which the on-duty ratio of the gate control signal is large to the primary side circuit 12 (first DC power source Va) in which the on-duty ratio is small.

Further, as shown in (a) and (b) of FIG. 7, the waveforms of the drain current Ida and the drain voltage Vda of the semiconductor switch Qa, and the waveforms of the drain current Ide and the drain voltage Vde of the semiconductor switch Qe do not overlap each other. Accordingly, it is shown that the switching losses of the semiconductor switch Qa and the semiconductor switch Qe can be reduced in the bidirectional DC/DC converter 11. Similarly, the switching losses of the other semiconductor switches Qb to Qd and Qf to Qh can be reduced.

As described above, according to the bidirectional DC/DC converter 11 of the first embodiment, pairs of semiconductor switches located on the diagonal lines among the semiconductor switches Qa to Qh of the bidirectional current switch provided on the primary side and the secondary side are alternately turned on and off. Further, the on-duty ratios that are switching frequencies of the pairs of the semiconductor switches are adjusted synchronously. Accordingly, by a very simple control operation, a desired DC power can be outputted bidirectionally between the primary side and the secondary side when one of a DC power source and a load is connected to the primary side and the other is connected to the secondary side.

Although various embodiments have been described with reference to the accompanying drawings, it is needless to say that the bidirectional DC/DC converter 11 of the present invention is not limited to the above example. While the invention has been shown and described with respect to the embodiments, it will be understood by those skilled in the art that various changes and modification may be made without departing from the scope of the invention as defined in the following claims.

What is claimed is:

1. A bidirectional DC/DC converter comprising:
a primary side circuit including a first DC power source or a first load;
a secondary side circuit including a second load or a second DC power source;
a power transfer unit configured to transfer a power bidirectionally between the primary side circuit and the secondary side circuit; and
a control unit configured to control the primary side circuit and the secondary side circuit by providing a first control signal to the primary side circuit and a second control signal to the secondary side circuit such that a current flows from the first DC power source to the second load or from the second DC power source to the first load through the power transfer unit,
wherein a power supply direction between the primary side circuit and the secondary side circuit is determined based on an on-duty ratio of the first control signal and an on-duty ratio of the second control signal.

2. The bidirectional DC/DC converter of claim 1, wherein the power transfer unit includes a transformer which transforms a voltage outputted from the primary side circuit and supplies the transformed voltage to the secondary side circuit, or transforms a voltage outputted from the secondary side circuit and supplies the transformed voltage to the primary side circuit,
wherein the primary side circuit comprises:
a first bidirectional current switch including a bridge circuit constituted by four semiconductor switches connected between two terminals connected to the first load or the first DC power source and a capacitor connected between the two terminals connected connected to the first load or the first DC power source;
a first control circuit which performs on/off control of each of the semiconductor switches by applying the first control signal to a gate electrode of each of the semiconductor switches; and
a first inductor, one end of which is connected to the first DC power source or first load, and the other end of which is connected to the capacitor of the bridge circuit,
wherein the secondary side circuit comprises:
a second bidirectional current switch including a bridge circuit constituted by four semiconductor switches connected between two terminals connected to the second load or the second DC power source and a capacitor connected between the two terminals connected to the second load or the second DC power source;
a second control circuit which performs on/off control of each of the semiconductor switches by applying the second control signal to a gate electrode of each of the semiconductor switches; and
a second inductor, one end of which is connected to the second DC power source or second load, and the other end of which is connected to the capacitor of the bridge circuit, and
wherein the control unit includes the first control circuit and the second control circuit.

3. The bidirectional DC/DC converter of claim 2, wherein each of a resonance frequency determined by an electrostatic capacitance of the capacitor of the primary side circuit and an inductance of the first inductor and a resonance frequency determined by an electrostatic capacitance of the capacitor of the secondary side circuit and an inductance of the second inductor is higher than a switching frequency of the eight semiconductor switches.

4. The bidirectional DC/DC converter of claim 2, wherein when the on-duty ratio of the first control signal is greater than the on-duty ratio of the second control signal, the bidirectional DC/DC converter supplies power from the primary side circuit to the secondary side circuit, and
wherein when the on-duty ratio of the first control signal is smaller than the on-duty ratio of the second control signal, the bidirectional DC/DC converter supplies power from the secondary side circuit to the primary side circuit.

5. The bidirectional DC/DC converter of claim 3, wherein the four semiconductor switches of the first bidirectional current switch are arranged such that,
the first control circuit alternately turns on a first pair of the semiconductor switches and a second pair of the semiconductor switches,
wherein the four semiconductor switches of the second bidirectional current switch are arranged such that the second control circuit alternately turns on a first pair of the semiconductor switches and a second pair of the semiconductor switches, and
wherein the first pair of semiconductor switches in the first bidirectional current switch operate in synchronization with the second pair of semiconductor switches in the second bidirectional current switch, and the second pair of semiconductor switches in the first bidirectional current switch operate in synchronization with the first pair of semiconductor switches in the second bidirectional current switch.

6. The bidirectional DC/DC converter of claim 5, wherein power supply from the primary side circuit to the secondary side circuit or vice versa is switched in response to control signals which are respectively outputted by the first control circuit and the second control circuit.

7. The bidirectional DC/DC converter of claim 1, wherein when the on-duty ratio of the first control signal is greater than the on-duty ratio of the second control signal, the bidirectional DC/DC converter supplies power from the primary side circuit to the secondary side circuit, and wherein when the on-duty ratio of the first control signal is smaller than the on-duty ratio of the second control signal, the bidirectional DC/DC converter supplies power from the secondary side circuit to the primary side circuit.

8. The bidirectional DC/DC converter of claim 1, wherein the primary side circuit includes a first bidirectional current switch configured to regenerate a first snubber energy, wherein the first bidirectional current switch includes a bridge circuit constituted by four semiconductor switches without reverse blocking capability and a first capacitor configured to absorb the first snubber energy and connected between an upper and a lower side of electric potential of the bridge circuit, each of the four semiconductor switches having a reverse conducting diode and p-channel metal-oxide-semiconductor field-effect transistor (P-MOSFET) connected in parallel, wherein the secondary side circuit includes a second bidirectional current switch configured to regenerate a second snubber energy, wherein the second bidirectional current switch includes a bridge circuit constituted by four semiconductor switches without reverse blocking capability and a second capacitor configured to absorb the second snubber energy and connected between an upper and a lower side of electric potential of the bridge circuit, each of the four semiconductor switches having a reverse conducting diode and P-MOSFET connected in parallel.

* * * * *